Figure 1:
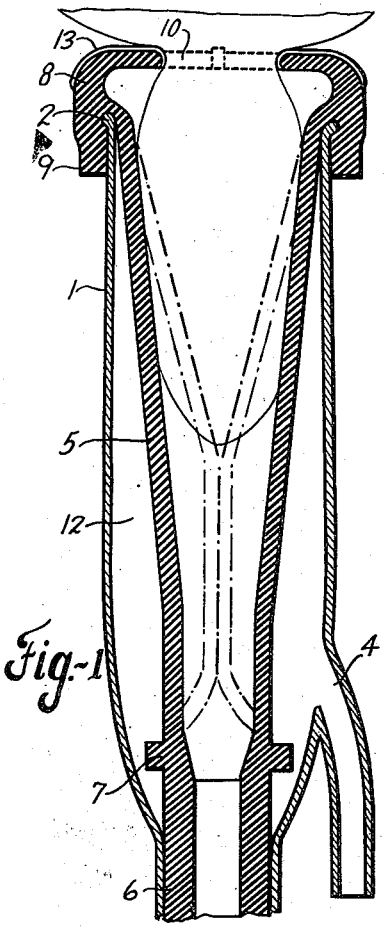

Feb. 1, 1944.  L. F. BENDER  2,340,295
TEAT CUP INFLATION
Filed Feb. 27, 1940

Lloyd F. Bender, Inventor
By F. L. Walker, Attorney

Patented Feb. 1, 1944

2,340,295

UNITED STATES PATENT OFFICE 2,340,295

TEAT CUP INFLATION

Lloyd F. Bender, Waukesha, Wis., assignor to The Universal Milking Machine Company, Waukesha, Wis., a corporation of Wisconsin Application February 27, 1940, Serial No. 321,082

5 Claims. (Cl. 31—85)

This invention pertains to milking apparatus, and more particularly to a teat-cup inflation therefor.

In the operation of mechanical milkers, more or less difficulty is encountered in milking the cows dry, that is, securing the maximum amount of milk by machine operation.

Cows of different herds, and in fact individual cows of the same herd, differ quite materially in their response to mechanical milking. Some cows are recognized as hard milkers, which refuse to "let down" and withhold their milk. This difficulty has heretofore been attributed to the physical condition or to the nervous reaction of the cow.

It is quite universal practice to test and hand "strip" the cow after the mechanical milking apparatus has been removed.

The teaching of the art has been to hermetically seal the contact of the teat-cup top with the cow's udder about the teat, and to subject the enclosed teat to a pulsating or intermittent suction or vacuum of approximately twelve inches, or six pounds equivalent air pressure. It has been discovered, however, after considerable research and experimentation, that under such conditions the teat chamber becomes "air locked" and that much of the difficulty heretofore attributed to the temperament or physical incapacities of the cow, to a very great degree, have been due to the apparatus and method of operation.

It is found that by breaking the seal at the top of the teat cup and permitting a slight seepage of air into the inflation during the suction interval, insufficient to materially reduce the vacuum or suction effect, but ample to induce a slight intake or current of air through the inflation simultaneous with the milk extraction, the cows will respond more readily and will milk out much more rapidly and more nearly completely, leaving less to be removed by hand-stripping.

The resultant favorable action from such air admission is augmented by a teat-cup inflation of such shape and character that it will support the teat in such relation that at each pulsation the inflation will completely close below the teat, thus momentarily completely arresting the suction and subjecting the enclosed teat to a massage squeeze from the end toward the udder, which prevents blood congestion and counteracts the effect of the vacuum, in a manner quite similar to the action of a calf while swallowing. During the swallowing action by a calf, not only the suction influence ceases, but the calf's tongue is forced against the roof of its mouth, exerting considerable pressure against the teat. This natural action in the present instance is reproduced by so designing and shaping the inflation that it completely collapses at each pulsation with an upward progressive pressure, due to the shape and proportion of the present inflation, which together with the admission of a small quantity of air upon the suction impulse is found to greatly facilitate the milking operation.

The object of the invention is to improve the construction, as well as the means and mode of operation of milking machine teat cups, whereby they may not only be economically manufactured, but will be more efficient in use, automatic in operation, uniform in action, having minimum parts and unlikely to get out of repair.

A further and highly important feature is the provision of means for breaking the seal of the top of the teat cup with the cow's udder to admit a small quantity of air during the suction impulse.

A further important object of the invention is the herein described improved method of operation incident to admission of air to the teat-cup chamber.

A further object of the invention is the herein described means and method of controlling the admission of air to the teat-cup chamber of the inflation and limiting the quantity thereof.

A further object of the invention is to provide a teat-cup inflation embodying the advantageous structural features and possessing the inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

Figure 2:
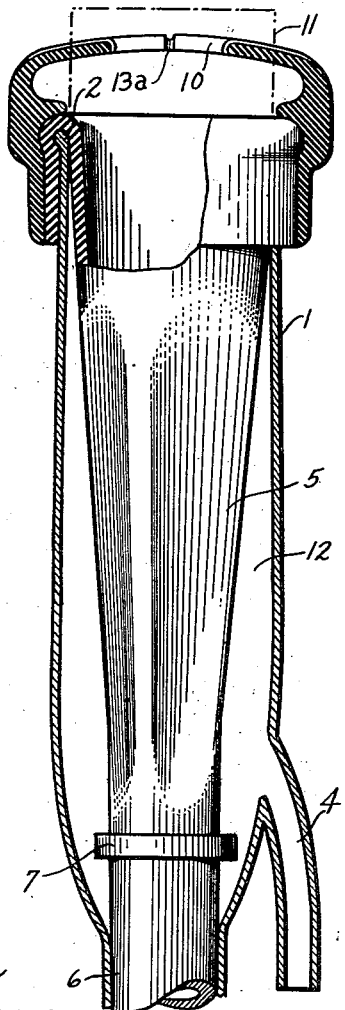
Figure 3:
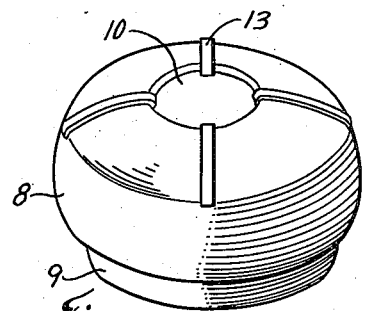
Figure 4:
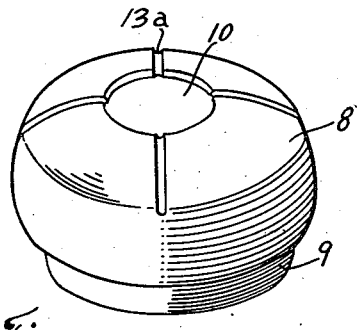

In the accompanying drawing, wherein is shown the preferred but obviously not necessarily the only form of embodiment of the invention, Fig. 1 is a longitudinal sectional view of an assembled teat cup for milking apparatus, embodying the present invention. Fig. 2 is a similar view, partly in section, illustrating a variation of the structure shown in Fig. 1, including the exterior of the portion of the inflation common to both disclosures. Fig. 3 is a perspective view of the head or cap portion of an inflation embodying the anti-seal feature of the present invention. Fig. 4 is a similar view of a modification.

Referring to the drawing, 1 is a conventional metal teat-cup shell having a beaded top margin 2. Communicating with the interior of the shell is a lateral nipple 4 for connection of an air tube leading to a pulsator mechanism.

Enclosed within the shell 1 is a tapered inflation unit 5, preferably, but not necessarily, of rubber, integrally with which is shown a continuing milk tube or conduit 6. A peripheral collar or flange 7 surrounnds the inflation 5 at its juncture with the milk tube 6. If so desired, the inflation 5 and milk tube 6 may be independent members. At its top the inflation is provided with a head 8, of enlarged size, including a dependent skirt portion 9 which overhangs and tightly encloses the beaded top margin 2 of the shell. The head 8 is inwardly flanged, affording a central teat receiving opening 10.

In Fig. 1 the head is shown as an integral part of the inflation 5. It may be formed independently thereof, as shown in Fig. 2. In such event, the upper end of the inflation body 5 is extended as shown by dotted lines at 11 in Fig. 2, and such extension is reversely folded outwardly over the margin 2 of the teat-cup shell 1, and the separately formed head 8 is positioned thereover.

It is to be understood that under conventional operating methods a constant suction or vacuum of predetermined degree is maintained upon the milk receiver with which the milk conduit 6 is connected. Consequently, the interior of the inflation is subject to the same degree of suction, except when the bottom of the inflation collapses completely. In addition to internal low pressure or suction influence, the inflation is subjected to alternating exterior low and higher pressures within the shell 1 in the space 12 surrounding the inflation. This is controlled by a pulsator mechanism which alternately connects such space 12 through the nipple 4 with the source of suction or vacuum influence and with atmosphere. The intermittent inrush of air at atmospheric pressure into the space 12 compresses the inflation 5, which collapses first at its lower end and completely shuts off the inflation passage and interrupts the suction upon the enclosed teat.

Additional to such controlled progressive flexing of the inflation, and coacting therewith to induce maximum extraction of milk, is the controlled admission of air to the interior of the inflation during the interval that the enclosed teat is subjected to suction influence. A small charge of air is admitted, preferably by slightly breaking the seal between the head 8 of the inflation and the cow's udder. Obviously, if a too great body of air is admitted, the vacuum will be destroyed and the teat cup will be released and will fall. However, it is found quite beneficial and effective, after subjecting the enclosed teat to maximum suction, to momentarily reduce the suction influence by admitting a small charge of air at atmospheric pressure about the teat and behind the charge of milk within the inflation chamber. While other forms of inlet valves for admitting atmospheric air to the inflation chamber may be employed, for simplicity and economy it is preferred to utilize the inflation head and engaged area of the cow's udder as a control valve.

To effect such restricted air admission when the maximum degree of suction has been attained, the terminal face of the head 8 of the inflation is embossed with either relief or intaglio lines 13 and 13a respectively. As shown in Figs. 1 and 3, two or more narrow radial ribs or beads 13 may be formed on the exterior surface of the head 8. In Figs. 2 and 4, radial indentations 13a are formed. Instead of straight grooves or ribs, the uneven area may comprise a design, or even letters or characters. The construction is such that while the teat-cup head 8 will seat against the cow's udder sufficiently tightly to hermetically seal the contact, due to such embossing the sealing effect is not uniform throughout the entire area of the contact surface. When the suction or vacuum within the inflation chamber reaches the maximum, the external air pressure overcomes the sealing resistance within a groove 13a or closely adjacent to one of the ribs or beads 13 or other irregularity of the surface and a very small charge of air rushes in. At such moment the enclosed teat, being subject to maximum vacuum influence, is fully relaxed and distended and a charge of milk withdrawn fills the throat of the inflation. The change of pressure within the inflation incident to the sudden admission of air under atmospheric pressure intermediate the teat-cup head and the udder imposes pressure initially about the base of the teat close to the udder, thus restricting the milk duct. The pressure is exerted thence downwardly along the teat in a manner somewhat similar to hand milking manipulation. The charge of air admitted above or behind the charge of milk in the inflation assists in expelling the extracted milk before the inflation collapses, under pressure of atmospheric air admitted to the space 12 in the shell upon alternation of the pulsator.

It is found in practice that the change of fluid pressure while the milk duct is full and while the teat is subjected to vacuum and compressive influence of the collapsed inflation is highly effective in increasing the milk flow, and that the milking operation, even on "hard milkers," is more completely accomplished, leaving but little "strippings." By the method herein described the enclosed teat is subjected to three distinct influences during each cycle, to wit, an initial suction incident to the vacuum induced within the inflation, a sudden relaxation of the suction influence incident to admission of air at the top of the inflation and rise of pressure, by which an external compression influence is exerted initially at the base of the teat and thence progressing downwardly, and finally a complete release of the teat from suction influence by the complete collapse of the inflation with compressive squeezing action upon the teat, starting at its end and progressing upwardly, which cycle is repetitiously performed in rhythmical sequence.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A milking machine teat cup, including a shell, a tapered flexible inflation therein, a head on the inflation for sealing contact engagement with a cow's udder under suction influence of a vacuum induced within the inflation, an irregularity forming an integral part of the contact surface of the head and locally weakening resistance of the sealing contact to entrance of air, and an air inlet in the shell for admission of air to permit collapse of the inflation, the construction and arrangement being such that an inserted teat is subjected initially to a maximum degree of suction influence by which the teat is relaxed and distended until the locally weakened resistance of the sealing contact is overcome and a charge of air is admitted between the inflation head and the cow's udder contiguous to the base of the teat, which is finally subjected to squeezing compression by collapse of the inflation permitted by entrance of air into the shell externally of the inflation.

2. A milking machine teat cup, including a shell, a tapered inflation therein, the resistance of which to collapse varies throughout its length, a head for the inflation of irregular surface contour for making un-uniform sealing contact with a cow's udder under internal suction influence and adapted to yield to the admission of air contiguous to the base of an enclosed teat when the resistance of the sealing contact is overcome, and an air inlet to the space intermediate the shell and inflation to permit collapse of the inflation, the construction and arrangement being such that the enclosed teat is relaxed and distended by initial suction influence of a surrounding vacuum within the inflation, and relieved by admission of a small charge of air intermediate the inflation head and cow's udder, by which the base of the relaxed and distended teat is subjected to external compression contiguous to the base of the teat and thence progressively toward its tip, and finally subjected to a progressive squeezing compression from the tip of the teat toward its base incident to collapse of the inflation upon admission of air to the shell, all in a continuous repetitious cycle.

3. An inflation for a milking machine teat cup, including a tapered tubular body of flexible material, non-circular cross-sectional contour adjacent its smaller end and uniformly merging thence without abrupt change into circular form at its upper end, and an exteriorly embossed head for hermetically sealed contact with a cow's udder under vacuum influence induced within the inflation, the sealing contact being un-uniform and locally yieldable under maximum vacuum influence to admit a limited charge of atmospheric air without totally destroying the seal or releasing the inflation.

4. A teat-cup assembly including an inflation, a head for sealing contact engagement with a cow's udder under internal vacuum influence, and a radial rib on the contact surface of the head, locally weakening the sealing engagement to permit entrance of a small charge of air without destruction of the vacuum influence.

5. A teat-cup assembly including an inflation, a head for sealing contact engagement with a cow's udder under internal vacuum influence, and a radial depression in the contact surface of the head, locally weakening the sealing engagement to permit entrance of a small charge of air without destruction of the vacuum influence.

LLOYD F. BENDER.